United States Patent [19]
Wilcox, Jr.

[11] Patent Number: 4,972,491
[45] Date of Patent: Nov. 20, 1990

[54] EAR-MIC HEADSET/EARDEFENDER

[76] Inventor: Edward R. Wilcox, Jr., 2266 Denair, Suite 223, Highland, Calif. 92346

[21] Appl. No.: 278,324

[22] Filed: Nov. 30, 1988

[51] Int. Cl.$^5$ .......................... H04M 1/05; H04R 1/08
[52] U.S. Cl. ....................................... 381/187; 381/72; 379/430
[58] Field of Search ............... 381/183, 187, 168, 169, 381/151, 188, 205, 72; 2/209

[56] References Cited

U.S. PATENT DOCUMENTS

| | | | |
|---|---|---|---|
| 2,946,862 | 7/1960 | Wadsworth et al. | 381/72 |
| 3,819,860 | 6/1974 | Miller | 381/187 |
| 4,006,318 | 2/1977 | Sebesta et al. | 381/151 |
| 4,652,702 | 3/1987 | Yoshii | 381/151 |
| 4,691,045 | 9/1987 | Rosenthal | 381/157 |
| 4,771,454 | 9/1988 | Wilcox, Jr. | 381/187 |

FOREIGN PATENT DOCUMENTS 1289993  9/1972  United Kingdom .................. 381/72

Primary Examiner—Jin F. Ng
Assistant Examiner—M. Nelson McGeary, III.
Attorney, Agent, or Firm—Sheldon & Mak

[57] ABSTRACT

A combination ear protector and communications headset particularly adapted to the rugged, lightweight, convenience needs of aircraft ground crew members that are required to work in a hazardous noise environment. The headset includes two earplug-type transducers that function as a combination ultrasensitive microphone and speaker which are automatically inserted into the user's ears when the invention is disposed for use, thereby sealing the interior of the ear from ambient noise. In the ear protection mode of use, the headset is quickly and easily convertible to communications usage.

20 Claims, 1 Drawing Sheet

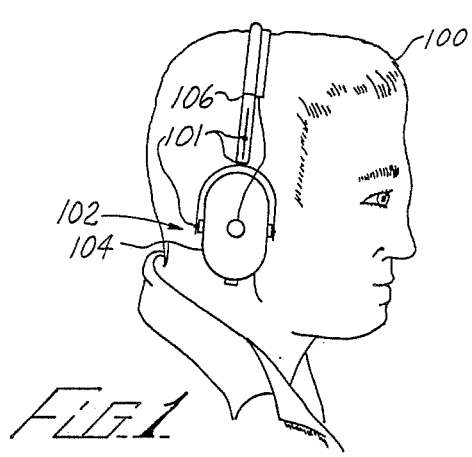
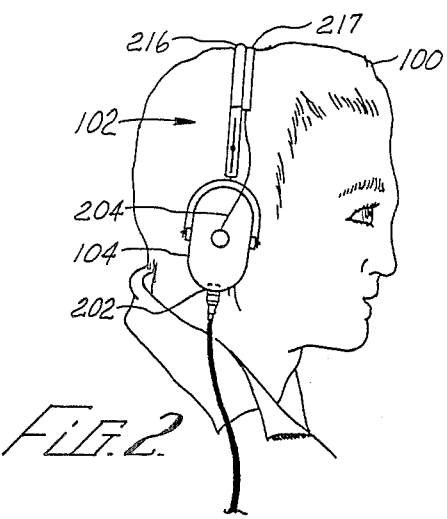
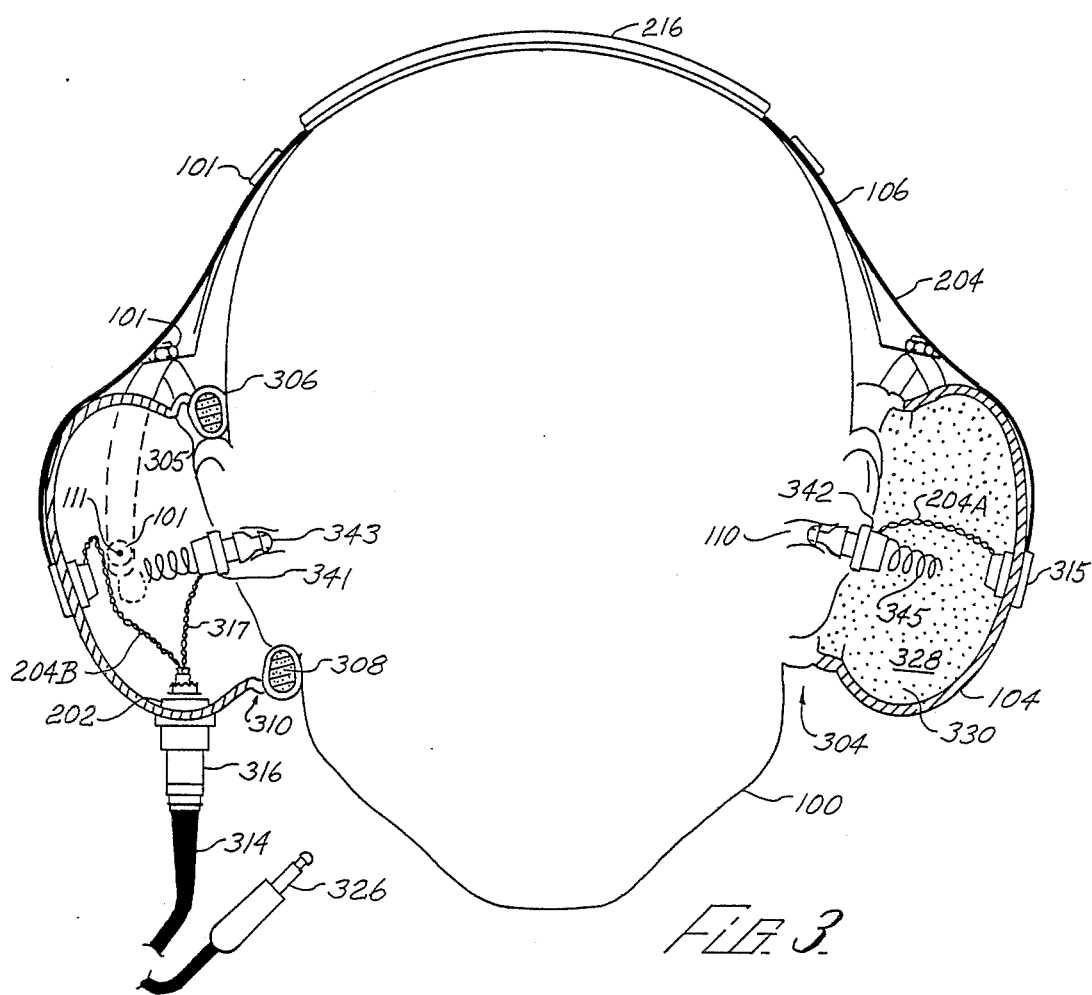

EAR-MIC HEADSET/EARDEFENDER

RIGHTS OF THE GOVERNMENT

Rights to the invention, described herein, made under federally-sponsored research and development are none.

CROSS REFERENCES

The Wilcox Ear-mic Headset/Ear-defender, Disclosure document No. 210256.

The Wilcox ear-mic headset/eardefender, Air Force Form 1279 "Disclosure and Record of Invention" signed Oct. 13, 1988.

BACKGROUND OF THE INVENTION

This invention relates to the field of head suspended ear covering apparatus usable for both protection against high intensity ambient noise and two way communication with the protected user subject.

Persons obligated to work in high ambient noise enviroments have been known to incur premature hearing loss and other medically abnormal conditions. The metal fabrication industries, certain construction work, sawmill operation, riveting, and certain types of mineral mining provide notable historical examples of work environments in which hearing loss has resulted from prolonged exposure to impact and other high-energy noises. In more recent times, persons working in close proximity to running aircraft engines, in electrical power generation plants, and as crew members in the gunnery turrets of naval vessels and armored tanks, may be exposed to undesirable levels of sound energy and, without the use of protective equipment, become susceptible to noise-induced physiological problems. In relatively recent times, the advent of occupational safety and health administrations (OSHA) at both the federal and state government levels, has increased the awareness and knowledge needed in preventing prolonged exposure to undesirable ambient noise. The OSHA espoused rules relating noise exposure time inversely with noise intensity have been particularly effective in reducing the incident of work-related hearing difficulties.

The new awareness, together with worker preference for convenient, lightweight and reliable hearing protection apparatus and the inherent requirements for a protected worker to communicate with other persons in his enviroment, has created a need for improvements in the hearing protection/communications equipment art. An opportunity for well-considered simple and rugged equipment of this type is clearly illustrated by the working environment of a military ground crew member in the aircraft maintenance arrival and departure operations of a U.S. Air Force base.

In this environment there is often a requirement for a ground crew member, positioned on the outside of an aircraft with a running engine to have the benefit of both ear-defending ambient noise protection and communication with pilot or other crew-members stationed inside the fuselage of the aircraft. In a slight variation of the scenario, a ground crew member can expect to need hearing protection without needing to converse with the aircraft crew. Such needs often occur where the aircraft of interest is in motion or where ear protection is needed from the sound generated by adjacent aircraft, or where power tools such as air driven drills or ratcheting devices must be used in the confined spaces of an aircraft. Since the need transition from simple ear protection to ear protection combined with communications capability can be expected to occur frequently and on short notice in the activities of ground crew personnel. It is desirable to provide such persons with a single piece of headset equipment that is capable of performing both the ear protecting and communications functions with reasonable efficiency. In the interest of assuring optimum ear protection and desirable headband characteristics as discussed below herein, the preferred equipment for such usage is in the nature of ear protection that is also provided with communications capability rather than communications apparatus that is used secondarily for ear protection.

In the Air force ground crew environment, experience has shown that operating lifetime and ability to withstand hard usage are especially demanding additional requirements for headset equipment. In the ground crew environment, hostile events in the nature of inclement weather conditions, headset droppage or other physical abuse, atmospheric dust and dirt and intense subjection to human body by-products such as moisture, salt, and organic oils, are expected headset operating life considerations. The prospect of droppage and other abuses is particularly great for equipment of this type. Such physical abuse and the other hostile conditions encountered frequently impose repeated repair requirements and general unreliability as expected attendants of using heretofore available headset equipment.

The oldest headset microphone that is still in wide use is known as the H-133c/AIC of which most were manufactured by the David Clark Company. It was bulky in construction, and had numerous wires exposed that were prone to damage. Additionally the earcup transducers were attached using annular ring assembly that often came loose, allowing the transducers to fall out of the earcup and the electrical connections to the transducers to sever and fail. The device had a microphone inside of a shield, commonly called a mic-muff. This mic-muff was attached to the earcups by straps and hardware which often failed, causing the operator to manually hold the mic-muff to his face. The H-133c/AIC was later banned for use by U.S. Air Force due to an unacceptible leakage of 2800 Hz.

The second headset microphone is the one that is most familiar to military aircrew members, the H-157/AIC manufactured by Astrocom Electronics Inc. The device was designed as a light weight communications headset not for use in a hazardous noise enviroment. It had an external boom-mounted microphone that was infamous for coming loose at the boom to earcup attachment point. The transducers inside the earcup came loose frequently, causing the electrical connections to fail. The device had a short life-span due to electrical connections failing, both to the transducers and at the electrical tether used to connect the headset to the headset.

An improved version of the H-157/AIC model is the H-157a/AIC. It has better hardware attaching the microphone boom to the earcup. However, it retained the inherent electrical failure flaws and can only be used in low to medium noise levels. The manufacturers are Astrocom Electronics Inc. and Roanwell Corporation.

With failure of the H-133c/AIC to protect the wearer due to the 2800 Hz leakage a new milspec emerged; the M7819/1-01-Manufactured by the David Clark Co. and Astrocom Electronics Inc. To eliminate the 2800 Hz leak the wires going into the earcups thru a rubber grommet have been replaced by a one piece wire harness that utilizes a molded plug with flanges that effectively seal the interior of the earcup from outside noise and all frequencies. At first this device was plagued by open circuits due to wear and tear inside the harness assembly. For the most part the wiring harnesses have been beefed up eliminating internal open circuits of the wiring harness. However, the transducers were frequently coming out of the earcups. This was due to them being held inside of the earcups by a cheap grade of acoustic foam. The result was failed electrical connections. The most notable problem this headset has is found at high noise levels, the ambient noise bleeds into the mic-muff. This noise and the operator yelling in the device causes excessive noise exposure to those personnel on the receiving end of the transmission. This type of headset is encumbered by an obtrusive mic-muff and a permanently attached tether cord.

My Pat. No. 4,771,454 headset was designed for medium noise levels and for rugged use. It utilized riveting a metal ring to the earcup to hold the transducer in place with no possible way for it to come loose and fail electrically. To ensure the electrical integrity of the tether, a provision to disconnect it from the earcup when the device is used as an eardefender was incorporated. Originally connections in and out of the earcups passed thru rubber grommets. Theoretically, a possibility of the 2800 Hz leak existed, the device was upgraded to the M87819/1-01 specs. However, the device did not pass the intelligibility test (with upgrading) at the 115 dB level, as tested by the U.S. Air Force.

After receiving the results of the test preformed on Pat. No. 4,771,454, I decided to invent a new type of communications headset that was unencumbered in design and usable in very high noise environments. To do this I would have to eliminate externally mounted appendage type microphone and increase the foam thickness in the earcup cavity. The later increases hearing protection to the user. This criterion revealed a need for a new type of microphone transducer and an unconventional location for this microphone. In a moment of insight I remembered an article concerning a device called an ear-mic. This device was both a speaker and microphone in a small earplug package. It was at that time I conceived the idea mount the ear-mics inside the earcups in such a manner that they would automatically be inserted into the user's ears when the invention was donned. I then proceeded with the construction and testing of the invention to prove its feasibility.

SUMMARY OF THE INVENTION

The present invention therefore provides a single headset capable of meeting the needs of aircraft ground crew members and other persons working in a hostile high noise, two-way communications environment. The headset of the invention provides in a single piece of apparatus a clean-cut and unencumbered and convienent-to-the-user ear protection apparatus while also making available with minimal time and changeover effort a reliable, and rugged communications headset apparatus.

It is an object, therefore, of the present invention to provide a combination ear protection and communications headset especially adapted to the needs of aircraft ground crew members.

It is another object of the invention to provide a ruggedized field use adapted combination ear protection and communication headset.

It is another object of the invention to provide a combination ear protection and communications headset in which the tether-free and unencumbered nature of the hearing protection apparatus is quickly and conveniently changed by the addition of a tether cord into an effective communications headset.

It is another object of the invention to provide a combination hearing protection and communications headset which is rugged in construction and capable of long operating life in a typical field work enviroment.

It is another object of the invention to provide optimum hearing protection to the user by automatically combining the use of single flange earplugs with the hardshell aural protector.

It is another object of the invention to provide a hearing protection and communications headset which can be realized through field modifications of existing available equipment.

It is another object of the invention to provide a headset which is of minimal parts count and is physically unencumbering in nature.

It is also an object of the invention to provide a combination hearing protection and communications headset having such desirable and convenient features as to encourage the use thereof.

It is further object of the invention to provide a combination hearing protection and communications headset which is of low maintenance and high operating reliability nature.

Additional objects and features of the invention will be understood from the following description and the accompanying drawings.

These and other objects of the invention are achieved by headset apparatus which includes the combination of a pair of ambient noise attenuating enclosure members disposable surrounding the external ears of a human user, spring-loaded headband apparatus attached at opposite ends thereof to each of the enclosure members and disposable over the head for supporting the enclosure members over the user external ears, transducer mounted inside the enclosure members for generating a user speech representative electrical signal and audio signal information to the ears of the human user, flexible conduit means detachably connected to one of the enclosure members for conveying human user communication signals between the transducer means and audio signal communicating means fixedly disposed with respect to the user, whereby the headset serves as a simple and unencumbered ear protection apparatus in the first utilization mode and as a ultrahigh noise tolerant communications headset in the second headset utilization mode, and requires only flexible conduit means attachment between the first and second utilization modes.

BRIEF DESCRIPTION OF THE DRAWINGS

FIG. 1 shows use of an apparatus in accordance with the invention in the ambient noise attenuating ear protecting use mode thereof.

FIG. 2 shows use of an apparatus in accordance with the invention apparatus in the combination ear protecting and communications use mode.

FIG. 3 shows details of the internal construction of apparatus made according to the invention.

DETAILED DESCRIPTION

FIG. 1 of the drawings shows a human user subject 100 wearing a combination ear protection and communications headset 102 made in accordance with the present invention. The headset 102 in FIG. 1 includes a shell member 104 which is disposed surrounding the right outer ear of the user subject 100; this shell member 104 is supported in the FIG. 1 position by a headband member 106 which is preferably of the spring-loaded metal strap type, and may include contour conforming. The headband 106 is presumed to be continuous in nature and to extend between the shell member 104 and a similar disposed shell member located over the left ear of the user subject 100, but not shown in FIG. 1. The two shell members are retained in the FIG. 1 indicated position over the ears of the user 100 by a combination of frictional force between each of the shell members and the cranial-facial surface of the user 100, and positive tensile support arising from positioning of the headband 106 over the top of the user's head or upper cranial surface.

Also shown in FIG. 1 are the various pivot and adjustment means 101 by which the shell member 104 is attached rotatable, about each of a pair of orthogonal axes, to the headband member 106 in a manner which is shown in greater detail in FIG. 3 of the drawings.

In the FIG. 1 representation of the headset 102, usage exclusively in the ear protection mode is contemplated.

In FIG. 2 of the drawings there is shown a second view of the headset 102 as this apparatus appears when affording both ear protection and communications ability to the user subject 100. Shown in the FIG. 2 drawing is the connector member 202 by which signals originating from the user subject 100 may be conveyed to a flexible tether cord for subsequent connection to apparatus that is fixed mounted with respect to the user 100. In the case of an aircraft ground crew member, this fixed object may, of course, be the aircraft which is being served by the ground crew member. The connector 202 may also be used for conveying signals of an electrical nature to the interior cavity of the shell member 104 for communicating with the user's ear. As explained below in greater detail, both the input and the output communication signals are preferably arranged to be electrical in nature. The conductor 204 is arranged to have length and routings about the headset apparatus such as will enable adjustments of the headband 106 without conductor interference. The FIG. 1 and FIG. 2 illustrated lateral entrace of the conductor 204 into the shell 104 is compatible with this requirement.

Also shown in FIG. 2 is the means by which the conductor 204 maintains a curved trajectory with the headband cover 216 being routed through a tubular flap 217 that is molded into the headband cover.

Additional details of the FIG. 1 and FIG. 2 illustrated ear protection and communications headset 102 are shown in FIG. 3 of the drawings in a cross-sectional view of the shell member 104 which also shows the interior cavity 328 and the components mounted therein. Included in the FIG. 3 view are the user subject 100, the shell member 104, the headband member 106, various pivot and adjustment means 101, which were all shown in FIGS. 1 and 2, along with an acoustic energy shielding foam 330 located within the cavity 328. The acoustic energy shielding foam 330 is preferably from plastic foam a non-reticular polyester or other pressure wave nonconducting materials which are known in the art.

Also shown in the FIG. 3 cross-sectional view is a resilient sealing member 304 which is disposed around an ear receiving aperture 305 in the shell member 104. The aperture 305 is shown to at least partially enclose or surround the outer ear 318 of the user 100. The resilient sealing member 304 is shown in FIG. 3 to include a liquid, plastic or rubber foam filled interior 308 which is surrounded by a doughnut-configured flexible plastic shell 306. The resilient sealing member 304 serves both to seal the interior cavity 328 of the shell member 104 with the cranial surface of the user 100 and thereby exclude external noise from the user's ear, and also serves to disperse force originating in the headband member 106 and tending to urge the shell member against the user's cranial surface in a user-comfortable and fatigue-reducing manner. The flexible plastic shell 306 may be retained in engagement with the shell member 104 by way of frictional or adhesive attachments disposed in the interface region 310, as is known in the art.

Also shown in FIg. 3 are the earplug-type transducers 341 and 342 which are both capable of converting an audio signal from the user subject's ear canal 110 into an electrical signal or converting an electrical signal into an audio signal into the user subject's ear canal 110. The tether cord 314 and electrical connector members 316 used in conveying electrical signals to and from the earplug-type transducers 341 and 342 is also shown in FIG. 3. The tether cord 314 is terminated at its distal end in a multiple circuit connector 326 which may be of the type known in the art. The tether cord 314 and second proximate end electrical connector 316 are arranged to be easily disengageable from the headset 102 by way of an electrical connector 202 that is permanently attached to the shell member 104. Electrical wires 317 shown in FIG. 3 are, of course, used to convey electrical signals between the connector 202 and the earplug-type transducer 341, electrical wires 204B convey electrical signals between the connector 202 and the conductor member 204 tht conveys signals to and from earplug transducer 342 via wires 204A.

Flanged rubber plugs 315 molded at the ends of conductor member 204 are preferably used to seal the wire-receiving holes in the lateral region of the shell member 104 where wiring connected with the earplug transducer 342, and the opposite ear shell member enter the shell 104 in order to seal the shell member 104 against entrance of undesired ambient noise. Electrical connections not shown in FIG. 3 are at connector 202 pin numbers 1 and 3 are connected via wires 317 to earplug transducer 341 and connector 202 pin numbers 2 and 4 are connected via 204B, 204 and 204A to earplug transducer 342. Connections between tether cord 314 and electrical connector member 316 can be made to conform to the requirements of the type of apparatus that is fixed mounted so that the earplug transducers transmit or received in stereo or monaural and further, as is would be required for the C-141B aircraft's AN/AIC-18A intercommunication system, one of the earplug transducers acts only as a microphone while the other acts only as a speaker element. An existing assembly, such as the David Clark Company Inc. harness replacement kit part number 40017G-01, can be adapted for the tether cord 314; this electrical cord assembly is equipped with a plug of the U-174/U type which may be used as the multiple circuit connector 326 in FIG. 3.

FIG. 3 of the drawings also shows details of the arrangement by which the headband 106 is mounted to be rotatable, with respect to the shell member 104, about a pair of orthogonal axes. This mounting may include, for example, metal pins extending from the midpoint region 111 of the shells 104, that mechanically connect with a semicircular metallic band that connects at its midpoint to a spring metal strip that is held in frictional proximity to the headband member 106 by a thumbscrew device or other captive but flexible engagement arrangements known in the mechanical art. Connection of the headband 106 to the shell member 104 should provide reasonable two dimension rotational freedom while also conveying the headband tension force to the shell member 104. With respect to components for the FIG. 1-3 apparatus, the earplug-type transducers 341 and 342 are preferably the type sold by Maxon systems Inc., item number 508-021-A. They have removable single flange earplugs 343 to accomodate different size of the user ear canals 110 and facilitate ease of cleaning. This type of transducer detects speech via the user's eustachian tube via ear canal via single flange plug acoustic duct. The earplug transducers are modified by bonding a metal helical spring 345 to the side opposite the side flange plug. Once bonded the spring 345 is corkscrewed, along with its transducer 341 or 342, into the acoustic energy shielding foam 330. This arrangement allows the earplugs the flexibility needed to align with the ear openings of the outer ear 318 and ear canal 110 when the headset 102 is disposed for use. This arrangement also allows the foam to compress when the single flange earplugs 343 have sealed the ear canal 110 maintaining a positive contact without excessive force. The earplug transducers are preferably hermetically sealed against the entry of dust and moisture.

The headband 106 is preferably made from spring metal and may be made adjustable in length if desired. The headband metal is preferably covered with plastic or other padding material 216 for user comfort and durability. The conductor 204 may be attached to the headband by way of a tubular flap 217 molded into the headband cover 216, as shown in FIG. 2 or other known arrangements which do not interfere with the mechanical integrity of the headband member 106. Both the headband and shell members 104 may be comprised of an off-the-self headset-microphone device such as the Astrocom Electronics Inc. model 10987A and also known by the National Stock Number of 5956-01-204-8505 and additionally identified by the military specification M87819/1-01. The shell members 104 in the Astrocom headset-microphone are made from a rigid plastic or other organic material.

The connector 202 which is permanently mounted on the shell member 104 may be in a four pin electrical connector such as the four-pin connector part number 274-002, which is sold by the Radio Shack division of Tandy Corp. and commonly used for microphone connection to a citizen's band transceiver. The matable connector 316 can also be obtained at Radio Shack as part number 274-001 for permanent attachment with the tether cord 314. The conductors 204A, 204 and 204B may be set of any convenient wire type; preferably two conductor spiral twist wire is used for the internal connectors 317, 204A and 204B while a two conductor spiral twist molded wire is used for the external connector 204.

Alternate arrangements of the FIGS. 1-3 illustrated apparatus are also within contemplation of the invention. Other shell arrangements, other shell-to-handband attachment arrangements, and other energy shielding or absorbing arrangements within the interior cavity 328 are, for example, also within contemplation of the invention.

It is notable that the described invention has avoided a "boom mounting" of, or third shell member used to shield, a noise cancelling microphone. Such common practices of a headset component is found to be both interference prone and damage susceptible in the field use enviroment of an aircraft ground crew member. It is also notable that the described arrangement of the invention permits an automatic and combined use of two types of hearing protection; the single flange molded earplug that seals the user's ear canal from ambient noise and the hardshell aural protector that further isolates the user's ear with a rigid shell member and approximately one-and-a-half inches of acoustic foam. Wearing the headset in the FIG. 1 described position is also notably convenient and unobtrusive to a busy user without danger of entanglement in or obstruction the user's normal activity.

The headset apparatus described herein is contemplated to be carried about without the tether wire 314 attached when not in use. Such carrying may occur, for example, when the headset is suspended from the belt of the user, wrapped around the user's neck, or suspended above an ear-surrounding position on the user's head. By way of the described nature of the headset, therefore its utilization for ear protection and/or communication purpose may be easily arranged from such carrying positions by simply repositioning the shell members 104 over the user's ears, for ear protection and by joining the connectors 202 and 316 and engaging the connector 326 for combined ear protection and communications use. The tether cord 314 may be carried about in the user's trouser pocket, in a tool kit or other convenient location when not in use.

The achievement of a lightweight, rough-usage immune, multi-function headset comprise additional notable aspects of the invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Dual system eardefender headset apparatus comprising the combination of:
    (a) a pair of rigid shell enclosure members each having organic material shell walls shaped for defining an interior cavity and to be disposable over outer ear portions of a human user with a shell wall aperture portion located immediately surrounding the outer ear portion;
    (b) spring-loaded curved trajectory metallic band means flexibly coupled at each end thereof to one of the shell members and disposable over an upper cranial surface of the user in substantial conformity therewith in a position thereof for holding the shell members positioned surrounding the outer ear portions;
    (c) acoustic energy shielding means disposed in each of the shell member interior cavities between the shell members and the outer ear portions for attenuating acoustic energy noise communicating with the ears via the shell interior cavity;

(d) resilient sealing means surrounding each shell wall aperture portion and disposable between the associated shell member and the cranial surface adjacent the outer ear portion for sealing an interface between the user and the shell members against acoustic energy leakage and for dispersing a reaction force from the band means over the cranial surface;

(e) an earplug mounted within each of the shell member interior cavities and supportively connected to the shielding means for projection of the earplug into a middle ear portion of the user, the earplug comprising a body portion and flange means for sealing the middle ear portion from ambient noise, whereby the apparatus is usuable as a tether and encumbrance-free ear protector utilizing both the earplug and the shielding means of each enclosure member.

2. The apparatus of claim 1, wherein the earplug is adjustably mounted to the shielding means for facilitating insertion of the earplug into the middle ear portion when the apparatus is worn by the user.

3. The apparatus of claim 1 wherein the shielding means comprises a foam material, the foam material covering the interior cavity of each shell member and being directly exposed to the user's outer ear portion when the shell member is held in position by the band means.

4. The apparatus of claim 3 wherein the foam material has a thickness of at least approximately 1.5 inches.

5. The apparatus of claim 1 further comprising transducer means within at least one of the shell members for converting acoustic signals to electrical signals and for converting electrical signals to acoustic signals, and means for transmitting the electrical signals between the shell member and an external device.

6. The apparatus of claim 5 wherein the transducer means is located in at least one of the earplugs, the earplug having an acoustic signal admitting opening within the middle ear portion for acoustically communicating externally originated information to the user and for generating an electrical signal representative of sounds spoken by the user, the spoken sounds being transmitted to the middle ear portion through an eustachian tube of the user.

7. The apparatus of claim 6 wherein the means for transmitting the electrical signals comprises cable means extending outwardly from one of the shell members, and flexible conductor means connecting the cable means to each of the earplugs, the conductor means protruding a resilient flanged plug at each of the shell members for admitting the conductor means to the interior cavity portions thereof while sealably excluding ambient acoustic noise from the interior cavity portions.

8. The apparatus of claim 7 wherein the cable means comprises first connector means mounted to the shell member for connecting a flexible cable.

9. The apparatus of claim 8 further comprising the flexible cable, the flexible having second connector means at a free end thereof for connecting to the external device.

10. The apparatus of claim 6 wherein the earplug comprises a transducer housing and a removable flanged earplug member for supporting the housing by the user's middle ear with the housing extending into the middle ear.

11. Eardefender headset apparatus comprising the combination of:

(a) a pair of rigid shell enclosure members each having organic material shell walls shaped for defining an interior cavity and to be disposable over outer ear portions of a human user with a shell wall aperture portion located immediately surrounding the outer ear portion;

(b) spring-loaded band means flexibly coupled at each end thereof to one of the shell members and disposable over an upper cranial surface of the user for holding the shell members positioned surrounding the outer ear portions;

(c) acoustic energy shielding means disposed in each of the shell member interior cavities between the shell members and the outer ear portions for attenuating acoustic energy noise communicating with the ears via the shell interior cavity;

(d) resilient sealing means surrounding each shell wall aperture portion and disposable between the associated shell member and the cranial surface adjacent the outer ear portion for sealing an interface between the user and the shell members against acoustic energy leakage and for dispersing a reaction force from the band means over the cranial surface;

(e) an earplug mounted within each of the shell member interior cavities and supportively connected to the shielding means for projection of the earplug into a middle ear portion of the user, the earplug comprising a body portion and flange means for sealing the middle ear portion from ambient noise, the supportive connection of the earplug to the shielding means comprising helical spring means having a first end portion thereof connected to the earplug and a second end portion penetrating the shielding means, whereby the apparatus is usable as a tether and encumbrance-free ear protector utilizing both the earplug and the shielding means of each enclosure member.

12. The apparatus of claim 11 wherein the earplug is physically attached to the spring means by permanent adhesive bonding means.

13. The apparatus of claim 11, wherein the earplug is adjustably mounted to the shielding meand by threaded engagement of the helical spring means with the shielding means for facilitating insertion of the earplug into the middle ear portion when the apparatus is worn by the user.

14. The apparatus of claim 11 wherein the shielding means comprises a foam material, the foam material covering the interior cavity of each shell member and being directly exposed to the user's outer ear portions when the shell member is held in position by the band means.

15. The apparatus of claim 11 further comprising transducer means within at least one of the shell members for converting acoustic signals to electrical signals and for converting electrical signals to acoustic signals, the transducer means being located in at least one of the earplugs, the earplug having an acoustic signal admitting opening within the middle ear portion for acoustically communciating externally originated information to the user and for generating an electrical signal representative of sounds spoken by the user, the spoken sounds being transmitted to the middle ear portion through an eustachian tube of the user, and means for transmitting the electrical signals between the shell member and an external device.

16. The apparatus of claim 15 wherein the means for transmitting the electrical signals comprises cable means extending outwardly from one of the shell members, and flexible conductor means connecting the cable means to each of the earplugs.

17. Convertible headset apparatus comprising the combination of:
   (a) a pair of ambient noise attenuating enclosure members disposable surrounding the external ears of a human user;
   (b) spring-loaded curved headband means rotatably attached at opposite ends thereof to each of the enclosure members and disposable over a head portion of the user for supporting the enclosure members;
   (c) audio signal transducer means disposed one each in each of the enclosure members for conveying audio signal information to and from the user by acoustic coupling with the middle ear portion of the user, comprising:
      (i) an acoustic energy shielding material filling a substantial internal volume of each of the enclosure members; and
      (ii) an earplug supportively connected to the shielding material for projection into the user's middle ear portion when the apparatus is donned by the user; and
   (d) means for detachably connecting a flexible conduit to one of the enclosure members for conveying human user communication signals between the transducer means and external signalling means, whereby the apparatus provides unencumbered ear protection in a first utilization mode and functions as a high ambient noise tolerant headset in second headset utilization mode and requires only attachment of the flexible conduit for converting between the first and second utilization modes.

18. The apparatus of claim 17 including the flexible conduit, comprising multiple-conductored electrical cable and electrical connector members and wherein a mating multiple-conductored electrical connector member is mounted on one of the enclosure members.

19. Communications headset apparatus for convenient intermittent use in high ambient noise environments by a vehicle crew member, the apparatus comprising the combination of:
   (a) a pair of rigid shell enclosure members each having an organic material shell wall structure including a cavity portion and an aperture portion connecting the cavity portion to an exterior portion of the enclosure, each aperture portion being receivable surrounding an outer ear structure of the crew member;
   (b) resilient sealing means disposable about the exterior portion of each enclosure member proximate the aperture portion for sealing an interface between the enclosure member and a cranial surface of the crew member against acoustic energy leakage and for distributing a normal force retaining the enclosure member against the cranial surface over a substantial area of the surface proximate the outer ear structure;
   (c) spring loaded curved trajectory metallic headband means pivotally coupled at each end thereof to one of the enclosure members and disposable over an upper cranial head surface of the crew member in substantial conformity therewith and for generating the normal force and for holding the enclosure members positioned surrounding the outer ear structures of the crew member;
   (d) acoustic energy shielding means disposed in each of the cavity portions between an inner surface of the enclosure member and the ear structures for attenuating acoustic energy noise communicating with the ear structure via the cavity portion;
   (e) transducer means flexibly mounted in each of the enclosure member interior cavities and disposed into each of ear structures for communicating externally originated information to the crew member and for generating an electrical signal representative of spoken sounds by the crew member;
   (f) helical spring means for connecting the transducer means to the shielding means within the enclosure member, the transducer means being physically attached to the spring means;
   (g) electrical conductor means disposed along the metallic headband means between the enclosure members for communicating electrical signals between the cavities thereof;
   (h) a flanged resilient plug member for sealing between the conductor means and the organic material of each of the enclosure members for admitting the electrical conductor means to the cavity portions while sealably excluding ambient external noise therefrom; and
   (i) electrical circuit connecting means including a multi-conductored flexible tether cord and multi-conductored mateable connector members, one of the connector members being mounted to one of the enclosure members, the other connector member being mounted on one end of the tether cord for communicating the transducer electrical signals between a fixed point in the environment of the crew member and the enclosure member is a connector mated condition thereof and for freeing the apparatus of tether encumbrances in a non mated connector condition thereof.

20. The apparatus of claim 19 wherein the crew member is a ground crew member.

* * * * *